United States Patent
Kataoka et al.

(10) Patent No.: US 7,849,492 B2
(45) Date of Patent: Dec. 7, 2010

(54) RECEIVING ACCUMULATING APPARATUS, SENDING APPARATUS, BROADCASTING SYSTEM, RECEIVE ACCUMULATING METHOD, SENDING METHOD, BROADCASTING METHOD, PROGRAM AND MEDIUM

(75) Inventors: Mitsuteru Kataoka, Katano (JP); Masahiro Takatori, Toyonaka (JP)

(73) Assignee: Panasonic Corporation, Osaka (JP)

( * ) Notice: Subject to any disclaimer, the term of this patent is extended or adjusted under 35 U.S.C. 154(b) by 1371 days.

(21) Appl. No.: 10/311,914

(22) PCT Filed: Jun. 22, 2001

(86) PCT No.: PCT/JP01/05365

§ 371 (c)(1),
(2), (4) Date: Jul. 17, 2003

(87) PCT Pub. No.: WO02/01869

PCT Pub. Date: Jan. 3, 2002

(65) Prior Publication Data

US 2004/0028388 A1    Feb. 12, 2004

(30) Foreign Application Priority Data

Jun. 26, 2000    (JP) .............................. 2000-190905

(51) Int. Cl.
- *H04N 7/173* (2006.01)
- *H04N 7/16* (2006.01)
- *H04N 7/18* (2006.01)
- *H04N 7/20* (2006.01)
- *H04N 7/00* (2006.01)

(52) U.S. Cl. .................. 725/134; 725/131; 725/68; 725/85; 725/139; 725/142; 725/151; 386/98

(58) Field of Classification Search .................. 725/63, 725/71, 114, 115, 131, 134, 138, 139, 145, 725/136
See application file for complete search history.

(56) References Cited

U.S. PATENT DOCUMENTS 4,694,490 A * 9/1987 Harvey et al. ............... 380/234

(Continued)

FOREIGN PATENT DOCUMENTS

EP    0 957 597    11/1999

(Continued)

OTHER PUBLICATIONS

International Search Report corresponding to application No. PCT/JP01/05365 dated Sep. 25, 2001.

(Continued)

*Primary Examiner*—Brian T Pendleton
*Assistant Examiner*—Pinkal R Chokshi
(74) *Attorney, Agent, or Firm*—RatnerPrestia

(57) ABSTRACT

A broadcasting system comprises a transmission apparatus, which multiplexes stream-format data based on a stream transmission protocol and file-format data based on a file transmission protocol with each other and sends them as a single stream, and receiving apparatuses which receive and temporarily accumulate stream-format data and file-format data which are sent as they are multiplexed with each other, and stream-format data and file-format data are temporarily accumulated as they directly are in the form of a single stream, all or some of file-format data are reproduced later at predetermined timing and accumulated once again as a file.

14 Claims, 9 Drawing Sheets

U.S. PATENT DOCUMENTS

| | | | | |
|---|---|---|---|---|
| 5,708,961 | A * | 1/1998 | Hylton et al. | 725/81 |
| 5,729,280 | A * | 3/1998 | Inoue et al. | 725/101 |
| 5,920,626 | A * | 7/1999 | Durden et al. | 380/210 |
| 5,966,120 | A * | 10/1999 | Arazi et al. | 715/724 |
| 6,005,600 | A * | 12/1999 | Hill | 725/134 |
| 6,353,930 | B1 * | 3/2002 | Shimoji et al. | 725/110 |
| 6,366,731 | B1 * | 4/2002 | Na et al. | 386/83 |
| 6,467,093 | B1 * | 10/2002 | Inoue et al. | 725/151 |
| 6,477,185 | B1 * | 11/2002 | Komi et al. | 370/536 |
| 6,588,015 | B1 * | 7/2003 | Eyer et al. | 725/89 |
| 6,614,843 | B1 * | 9/2003 | Gordon et al. | 375/240.01 |
| 6,671,290 | B1 * | 12/2003 | Murayama et al. | 370/486 |
| 6,675,388 | B1 * | 1/2004 | Beckmann et al. | 725/136 |
| 6,754,271 | B1 * | 6/2004 | Gordon et al. | 375/240.12 |
| 6,757,305 | B1 * | 6/2004 | Soepenberg et al. | 370/536 |
| 6,779,198 | B1 * | 8/2004 | Morinaga et al. | 725/134 |
| 6,782,553 | B1 * | 8/2004 | Ogawa et al. | 725/146 |
| 6,966,065 | B1 * | 11/2005 | Kitazato et al. | 725/116 |
| 6,993,248 | B1 * | 1/2006 | Kato | 386/69 |
| 7,039,936 | B1 * | 5/2006 | Inoue et al. | 725/59 |
| 7,065,781 | B1 * | 6/2006 | Entwistle | 725/135 |
| 7,188,353 | B1 * | 3/2007 | Crinon | 725/32 |
| 7,278,152 | B1 * | 10/2007 | Rao | 725/91 |
| 2005/0229213 | A1 * | 10/2005 | Ellis et al. | 725/58 |

FOREIGN PATENT DOCUMENTS

| | | |
|---|---|---|
| EP | 1 006 531 | 6/2000 |
| EP | 1 014 620 | 6/2000 |
| JP | 2000-31921 | 1/2000 |
| JP | 2000-36946 | 2/2000 |
| JP | 2000-115095 | 4/2000 |
| JP | 2000-201317 | 7/2000 |
| WO | WO 98/43415 | 10/1998 |
| WO | WO 99/65230 | 12/1999 |

OTHER PUBLICATIONS

English translation of Form PCT/ISA/210.

Balabanian V. et al.; "An Introduction to Digital Storage Media—Command and Control"; IEEE Communications Magazine, IEEE Service Center, New York, NY, US, vol. 34, No. 11, Nov. 1996, pp. 122-127, XP000636135; ISSN: 0163-6804.

Crinon R.J.; "The DSM-CC Object Carousel for Broadcast Data Services"; International Conference on Consumer Electronics IEEE, Jun. 11, 1997, pp. 246-247, XP010250059.

* cited by examiner

RECEIVING ACCUMULATING APPARATUS, SENDING APPARATUS, BROADCASTING SYSTEM, RECEIVE ACCUMULATING METHOD, SENDING METHOD, BROADCASTING METHOD, PROGRAM AND MEDIUM

THIS APPLICATION IS A U.S. NATIONAL PHASE APPLICATION OF PCT INTERNATIONAL APPLICATION PCT/JP01/05365.

TECHNICAL FIELD

The present invention relates to a receive accumulating apparatus, a sending apparatus, a broadcasting system, a receive accumulating method, a sending method, a broadcasting method, a program and a medium, used for a cumulative broadcasting service, in which information such as electronic newspapers which is sent as a broadcast on electric waves or a communication on the Internet and is updated as time elapses, and the like are temporarily accumulated so that a user watches the accumulated content.

BACKGROUND ART

"Cumulative broadcasting service" and "Server-type broadcasting service" sometimes refer to a service that data distributed via broadcasting are automatically accumulated temporarily within a receiving apparatus and updated and a user watches the cumulative data at desired time.

Conventional techniques will now be described with reference to drawings. The same elements and portions will be denoted at the same reference symbols among a plurality of drawings and will not be described redundantly.

FIG. 8 is an explanatory diagram of a phase of accumulating data for a cumulative broadcasting service in a receiving apparatus according to a conventional technique.

Before describing the phase of accumulating data, a structure of the conventional receiving apparatus will be described first.

The conventional receiving apparatus comprises a tuner 210, a TS decoder 220, accumulating means 230, an AV decoder 240, graphics drawing means 250, presenting means 260, inputting means 270, a CPU 281, a RAM 282 and a ROM 283.

The tuner 210 receives a broadcasting wave and outputs an MPEG (Moving Picture Experts Group) 2-TS (Transport Stream) which is the signal format of a bit stream in which video, speech and data are multiplexed with each other. MPEG2-TS is defined in ISO/IEC 13818-1 which is an international standard, "Information Technology-Coding of Moving Pictures and Associated Audio for Digital Storage Media at up to about 1.5 Mbit/s—Part 1: Systems." and used as a standard in the world for multiplexed transmission of video, speech and data in digital broadcasting.

The TS decoder 220 receives an MPEG2-TS outputted from the tuner 210, and separates video, speech and the other data from each other and outputs or deciphers a code.

The TS decoder 220 comprises a descrambler 221, a PID filter 222 and a section filter 223.

The descrambler 221 deciphers codes on an MPEG2-TS used in digital broadcasting. As such codes, Multi-2 or the like is used in Japan. The PID filter 222 extracts particular information, such as particular video alone, from an MPEG2-TS supplied to the TS decoder 220. Information is multiplexed in the unit of packets which are called TS packets defined by MPEG2-TS and each having 188 bytes, and distinguished by a 13-bit field which is added to each packet and called PID (packet id). For example, when video alone needs to be extracted from an MPEG2-TS in which video, speech and data are multiplexed with each other, it is only necessary to selectively extract those TS packets which have PIDs which are assigned to video. The PID filter 222 is capable of extracting TS packets which have one PID or a plurality of PIDs designated in advance from a received MPEG2-TS.

Further, the PID filter 222 supplies three outputs, (1) one to the accumulating means 230, (2) another to the section filter 223 and (3) the other to the AV decoder 240, and is capable of designating one or more than one PIDs to each output and simultaneously processing them.

The section filter 223 selects a data structure called a DSM-CC section (hereinafter sometimes referred to simply as "section") contained in an MPEG2-TS outputted from the PID filter 222.

DSM-CC and a DSM-CC section are a data structure of maximum about 4 K bytes defined in ISO/IEC 13818-6 which is an international standard, "Part 6: Extensions for Digital Storage Media Command and Control," contains fields such as table_id which is 8 bits, table_id_extension of 16 bits, section_number of 8 bits and version_number of 5 bits which expresses a version, and identified by means of these fields. Hence, in the same transmission path, the contents of sections in which these fields are identical are the same with each other (during a period in which these ids are used up but will not be assigned once again).

On some occasions, in the field of data broadcasting, data content refers to still pictures which constitute a data broadcast or such data described in BML (Broadcasting Markup Language), which is a descriptive language for descriptions on the screen, created on the premise that the data will be presented to users.

Further, in cumulative broadcasting, for the purpose of managing data content, video, speech and the like stored in a cumulative medium of a receiving apparatus, an additional information file called meta data is used. Meta data herein referred to are described by XML (eXtensible Markup Language), etc. Stored in meta data are information needed to manage the version of data content, expiration dates and the like. With the meta data interpreted, it is possible to update the data content, video, speech and the like stored by the receiving apparatus in the cumulative medium or delete those which have already expired.

While data content and meta data are information in the so-called file format, as an air format for transmission of such information, a scheme called a DSM-CC data carrousel is used. A DSM-CC data carrousel is transmitted using the sections described earlier. In other words, this is an air format located in an upper layer above the sections. Files are transmitted in the unit of so-called modules.

Like DSM-CC sections, modules and DSM-CC data carrousels are defined in ISO/IEC 13818-6, an international standard.

The accumulating means 230 is a hard disk drive. The accumulating means 230 is capable of receiving and accumulating streams, such as an MPEG2-TS, outputted from the TS decoder 220, outputting an accumulated MPEG2-TS, or writing and reading data developed in the RAM 282 as a file.

The accumulating means 230 includes an area 231 in which streams are accumulated and an area 232 in which files are accumulated. These areas correspond to partitions which are physically ensured on the accumulating means 230.

With respect to the area 231 in which streams are accumulated, the byte count of a block, which is the minimum unit for writing in the accumulating means 230, is set relatively large, so as to realize continuous writing/reading at a high speed.

On the other hand, with respect to the area 232 in which files are accumulated, the byte count of a block is relatively small, for the purpose of enhancing the processing speed for reading and writing of a small file through random accesses and improving the utilization efficiency of the area, instead of prioritizing continuous writing.

The AV decoder 240 receives an MPEG2-TS outputted from the TS decoder 220, decodes a multiplexed video and speech stream from the MPEG2-TS and accordingly converts into a video signal and a speech signal.

The graphics drawing means 250, under the control of the CPU 281, displays GUI (Graphic User Interface) on the screen and pastes in the GUI screen the video signal outputted by the AV decoder 240.

The presenting means 260 is a telereceiver or a CRT (Cathode Ray Tube) which comprises a video input and a speech input. The presenting means 260 may comprise a speaker.

The inputting means 270 is an input device which accepts manipulations given by a viewer, and comprises an infrared remote controller and a light receiver unit for the infrared remote controller for instance.

The CPU 281 is a central processing unit used in an ordinary computer (CPU; Central Processing Unit).

The RAM 282 is a main memory RAM (Random Access Memory) formed by a semiconductor memory and used in an ordinary computer.

The ROM 283 is a ROM (Read Only Memory) for storing a program and the like formed by a semiconductor memory and used in an ordinary computer.

The phase of accumulating data for a cumulative broadcasting service in the conventional receiving apparatus will now be described.

First, the PID filter 222 is provided with designation as for the PID of video and speech to be accumulated. In response, as denoted at the arrow 811 in FIG. 8, an AV stream is outputted. On some occasions, a partial TS refers to such an MPEG2-TS which is obtained by extracting only one pair of video and speech in particular from the MPEG2-TS containing various data and added some additional information. The AV stream denoted at the arrow 811 can also be said as a partial TS.

Next, the AV stream 811 is stored in the area 231 of the accumulating means 230 for accumulating streams, whereby AV streams get accumulated in the accumulating means 230 as streams of data 801.

Meanwhile, in the PID filter 222, PIDs are designated with which data of a data carrousel, which contains such data as MBL documents or still pictures to be accumulated, are transmitted. As a result, the MPEG2-TS of a data carrousel designated at the arrow 821 is extracted.

Next, a desired section is selected from the MPEG2-TS of the data carrousel by the section filter 223 and outputted as data in the section format. Thus outputted section format data are stored by the CPU 281 in the RAM 282, as a data carrousel is decoded, a file transmitted by means of the data carrousel is created.

Then, the created files are stored in the area 232 for accumulating files of the accumulating means 230 as file 802.

If there are meta data within thus created file, the CPU 281 interprets the meta data. Meta data contain information for controlling accumulated content, such as correlation between files to be accumulated, information regarding names and the like for presentation to users, information regarding expiration dates, copyright and the like, and information regarding versions, scheduling and the like of updating.

FIG. 9 is an explanatory diagram showing a phase of reproducing data for a cumulative broadcasting service in the conventional receiving apparatus.

First, as denoted at the arrow 911, data 802 stored in the file accumulation area 232 of the accumulating means 230 are read out (802 is a BML document for instance).

Next, storing in the RAM 282 is carried out, the CPU 281 starts up a BML engine and the BML document is interpreted, whereby the graphics drawing means 250 creates a GUI screen.

The status of the BML engine then transits in accordance with an input provided through the inputting means 270.

Assume now that reproduction of video and speech is instructed during the status transition. As denoted at the arrow 921, the AV streams 801 stored in the stream accumulation area 231 of the accumulating means 230 are outputted and fed to the PID filter 222.

Following this, as denoted at the arrow 922, these are supplied to the AV decoder 240 via the PID filter 222 and reproduced.

By the way, a possible state in cumulative broadcasting may be that video and speech used for cumulative broadcasting, data content and meta data are transmitted from the broadcast. On this occasion, it is necessary for the accumulating means to receive and accumulate the video and speech and the data content simultaneously. Further, concurrently with the accumulation, the accumulated content is processed by receiving, decoding and interpreting the meta data.

While a high-volume cumulative medium which can be accessed at random, such as a hard disk and a DVD (Digital Versatile Disk)-RAM, may be selected as the cumulative medium, such a random access accompanies physical movements of a head for reading and writing. Hence, writing of data in the cumulative medium or retrieval of data from the cumulative medium is interrupted for or over a certain period of time before and after the head movements, and when reading and writing accompanying head movements are demanded even for a small file during continuous reading and writing of video and speech which need a particularly high transfer rate, reading and writing of the video and speech may not complete in time.

A hard disk in particular for example, being tuned so as to suit reading and writing of a relatively small file through random accesses, is not good at reading and writing at a high transfer rate.

A conventional approach therefore is to prepare a file mode which is optimized for reading and writing of a file and a stream mode which is optimized for reading and writing of a stream such as video and speech, and to use a block having a larger byte count in which the cumulative medium is physically read out or written in the stream mode thereby enhancing capabilities (Methods for this include a method which realizes this by means of an operation mode of the cumulative medium itself and a method which logically realizes this by means of software which is executed by a CPU of the receiving apparatus.).

However, an area which is written in under the stream mode and an area which is written in under the file mode are associated with partitions which are physically different areas on the cumulative medium. Because of this, the head must move a far distance between the stream mode and the file mode, and occurrence of processing in the file mode in the middle of the stream mode serves as an obstacle hindering the processing under the stream mode (Although it is possible to avoid a drop in processing speed with better capabilities of the cumulative medium such as a hard disk, the CPU of the receiving apparatus and the like of course, this may make the apparatus expensive or increase the consumption power.).

DISCLOSURE OF THE INVENTION

Considering the problems above with the conventional techniques, the present invention aims at providing a receive accumulating apparatus, a sending apparatus, a broadcasting system, a receive accumulating method, a sending method, a broadcasting method, a program and a medium which realize inexpensively a cumulative broadcasting service without missing data content, meta data, video and speech or adversely influencing other data processing.

One aspect of the present invention is a receive accumulating apparatus of receiving video and/or speech data and file-format data which are sent as they are multiplexed with each other from the side of a sending apparatus, which multiplexes video and/or speech data encoded based on a stream transmission protocol and file-format data encoded based on a file transmission protocol with each other and sends said video and/or speech data and said file-format data as a single stream, and temporarily accumulating said stream-format data and said file-format data as they directly are in the form of a single stream, wherein all or some of said file-format data are decoded later at predetermined timing and accumulated once again as a file.

Another aspect of the present invention is the receive accumulating apparatus, wherein said video and/or speech data and said file-format data which are temporarily accumulated as a single stream are reproduced utilizing all or some of said file-format data which are accumulated once again.

Still another aspect of the present invention is the receive accumulating apparatus, wherein said predetermined timing is such timing which does not obstruct predetermined data processing which needs in real time.

Yet still another aspect of the present invention is the receive accumulating apparatus, wherein decoding of all or some of said file-format data is executed at a predetermined processing speed.

Still yet another aspect of the present invention is the receive accumulating apparatus, wherein said file-format data contain meta data, there is a temporary memory which temporarily stores said meta data, and said meta data are stored in said temporary memory after decoded at said predetermined timing as said file-format data, and used for management of said data which are accumulated.

A further aspect of the present invention is the receive accumulating apparatus, wherein (1) accumulation of said video and/or speech data and said file-format data which are to be temporarily accumulated as a single stream and (2) accumulation of all or some of said file-format data which are to be decoded and accumulated once again as a file are executed using accumulation areas which are physically and/or logically different from each other.

A still further aspect of the present invention is the receive accumulating apparatus, wherein said stream transmission protocol is MPEG Video and/or MPEG Audio, said file transmission protocol is a DSM-CC data carrousel, and the format of said single stream is MPEG-2TS.

A yet further aspect of the present invention is the receive accumulating apparatus, wherein temporary accumulation of said video and/or speech data and said file-format data as a single stream is carried out through isochronous transfer according to IEEE1394, and re-accumulation of all or some of said file-format data as a file is carried out through asynchronous transfer according to IEEE1394.

An additional aspect of the present invention is a broadcasting system which comprises: a sending apparatus which multiplexes video and/or speech data encoded based on a stream transmission protocol and file-format data encoded based on a file transmission protocol with each other and sends said video and/or speech data and said file-format data as a single stream; and a receive accumulating apparatus which receives said video and/or speech data and said file-format data which are sent as multiplexed with each other and temporarily accumulates said video and/or speech data and said file-format data as they directly are in the form of a single stream, wherein all or some of said file-format data are decoded later at predetermined timing and accumulated once again as a file.

A still additional aspect of the present invention is a receive accumulating method, comprising:

a first step of receiving video and/or speech data and file-format data which are sent as multiplexed with each other from the side of a sending apparatus, which multiplexes video and/or speech data encoded based on a stream transmission protocol and file-format data encoded based on a file transmission protocol with each other and sends said video and/or speech data and said file-format data as a single stream, and temporarily accumulating said video and/or speech data and said file-format data as they directly are in the form of a single stream; and a second step of decoding all or some of said file-format data later at predetermined timing and accumulating said all or some of said file-format data once again as a file.

A still yet additional aspect of the present invention is a broadcasting method, comprising:

a first step of multiplexing video and/or speech data encoded based on a stream transmission protocol and file-format data encoded based on a file transmission protocol with each other and sending said video and/or speech and said file-format data as a single stream;

a second step of receiving said video and/or speech data and said file-format data which are sent as multiplexed with each other and temporarily accumulating said video and/or speech data and said file-format data as they directly are in the form of a single stream; and a third step of decoding all or some of said file-format data later at predetermined timing and accumulating said all or some of said file-format data once again as a file.

A supplementary aspect of the present invention is a program which makes a computer function as all or some part of the steps in the receive accumulating method, namely, the first step of receiving video and/or speech data and file-format data which are sent as multiplexed with each other from the side of a sending apparatus, which multiplexes video and/or speech data encoded based on a stream transmission protocol and file-format data encoded based on a file transmission protocol with each other and sends said video and/or speech data and said file-format data as a single stream, and temporarily accumulating said video and/or speech data and said file-format data as they directly are in the form of a single stream; and the second step of decoding all or some of said file-format data later at predetermined timing and accumulating said all or some of said file-format data once again as a file.

A yet supplementary aspect of the present invention is a program which makes a computer function as all or some part of the steps in the broadcasting method, namely, the first step of multiplexing video and/or speech data encoded based on a stream transmission protocol and file-format data encoded based on a file transmission protocol with each other and sending said video and/or speech data and said file-format data as a single stream; the second step of receiving said video and/or speech data and said file-format data which are sent as multiplexed with each other and temporarily accumulating said video and/or speech data and said file-format data as they directly are in the form of a single stream; and the third step of decoding all or some of said file-format data later at predetermined timing and accumulating said all or some of said file-format data once again as a file.

A still yet supplementary aspect of the present invention is a medium which can be processed on a computer and which carries the program.

Another aspect of the present invention is a medium which can be processed on a computer and which carries the program.

Figure 1:
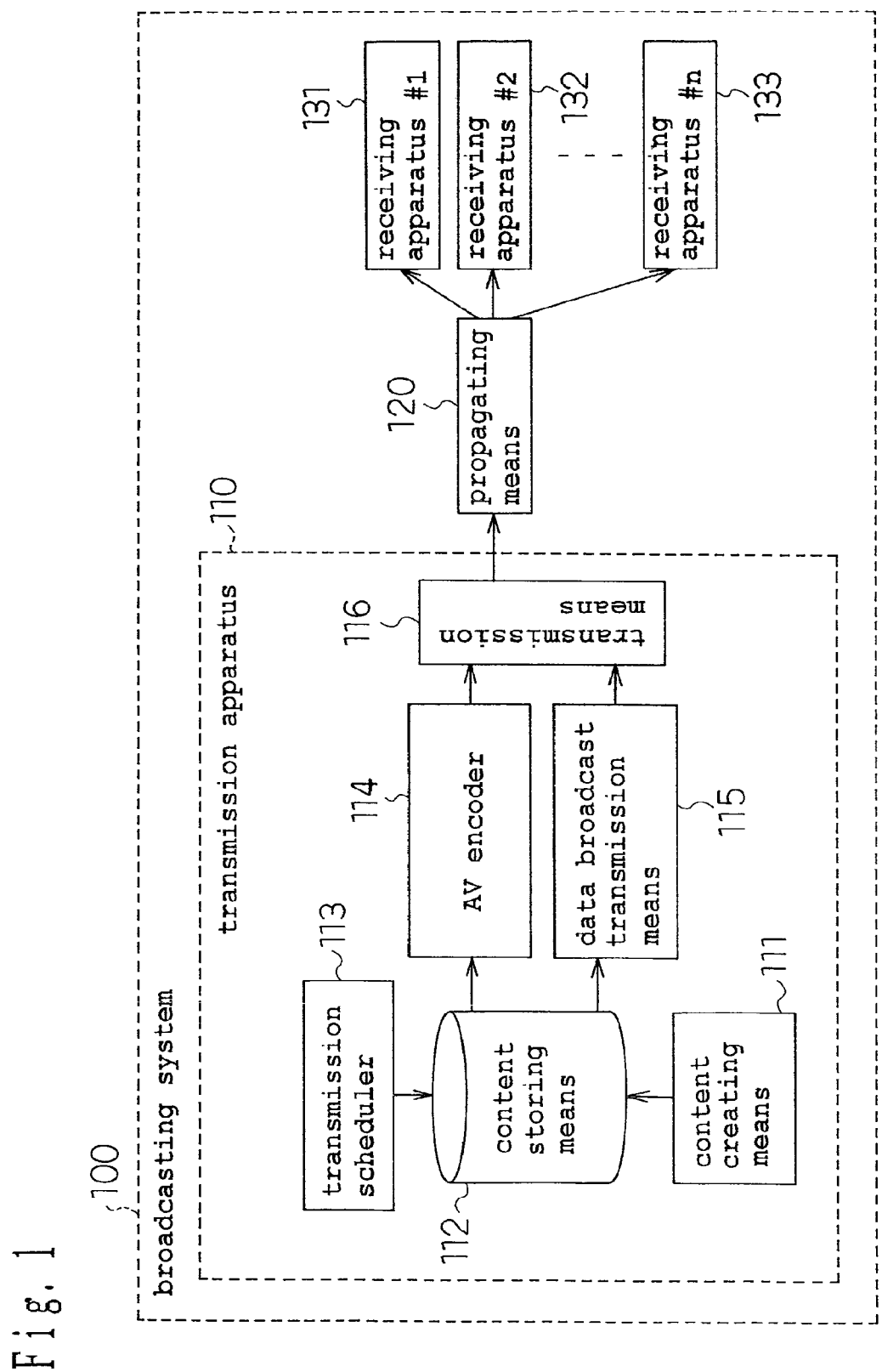
FIG. 1 is a block diagram of a broadcasting system for cumulative broadcasting according to a first preferred embodiment of the present invention.

EXPLANATION OF THE REFERENCE SYMBOLS 100 broadcasting system
110 transmission apparatus
111 content creating means
112 content storing means
113 transmission scheduler
114 AV encoder
115 data broadcast transmission means
116 transmission means
120 propagating means
131 receiving apparatus #1
132 receiving apparatus #2
133 receiving apparatus #n

BEST MODE TO IMPLEMENT THE INVENTION

A preferred embodiment of the present invention will now be described with reference to the associated drawings.

First Preferred Embodiment

First, a structure of a broadcasting system according to a first preferred embodiment will be described with reference to FIG. 1. FIG. 1 is a block diagram of the broadcasting system for cumulative broadcasting according to the first preferred embodiment.

Denoted at 100 is a broadcasting system as a whole according to the present invention. The broadcasting system 100 comprises a transmission apparatus (sending apparatus) 110, propagating means 120, and a plurality of receiving apparatuses (receive accumulating apparatuses) 131, 132 and 133.

The transmission apparatus 110 is a facility located in a broadcasting station which transmits data which are relevant to a cumulative broadcast. The transmission apparatus 110 comprises content creating means 111, content storing means 112, a transmission scheduler 113, an AV encoder 114, a data broadcast transmission apparatus 115, and transmission means 116.

The content creating means 111 is an authoring tool for creating a BML document, a still picture, video and speech and the like, associates them and accordingly creates content. Further, the content creating means creates meta data at the same time which are information for controlling accumulated content.

The content storing means 112 stores the content created by the content creating means 111.

The transmission scheduler 113 instructs the content storing means 112 to output a BML document, a still picture, video/speech and meta data which constitute the content in accordance with a transmission schedule regarding a cumulative broadcast.

The AV encoder 114 encodes video and speech stored in the content storing means in a format which is suitable to transmission. For instance, the AV encoder 114 comprises an MPEG2-Video encoder and an MPEG2-AudioAAC (Advanced Audio Codec) encoder.

The data broadcast transmission apparatus 115 receives the BML document, the still picture, the meta data and the like outputted from the content storing means 112, encodes them by means of the DSM-CC data carrousel.

The transmission means 116 multiplexes the outputs from the AV encoder 114 and the data broadcast transmission means 115, and further, converts them into a format which is suitable to transmission by the propagating means 120 and outputs them. The transmission means 116 may be an MPEG2-TS multiplexer used in transmission facilities for digital broadcasting.

The propagating means 120 transmits the output from the transmission apparatus to one or more than one receiving apparatuses 131, 132 and 133 which are located at physically far places. In the event that the broadcasting system 100 assumes BS (Broadcast Satellite) digital broadcasting, the propagating means 120 is an uplink facility to a satellite, a BS broadcast satellite and BS dishes attached to the respective receiving apparatuses.

The receiving apparatuses 131, 132 and 133 are receiving apparatuses which are compatible with cumulative broadcasting. In the field of broadcasting systems, in general, a great number of receiving apparatuses are present in one broadcasting system.

Figure 2:
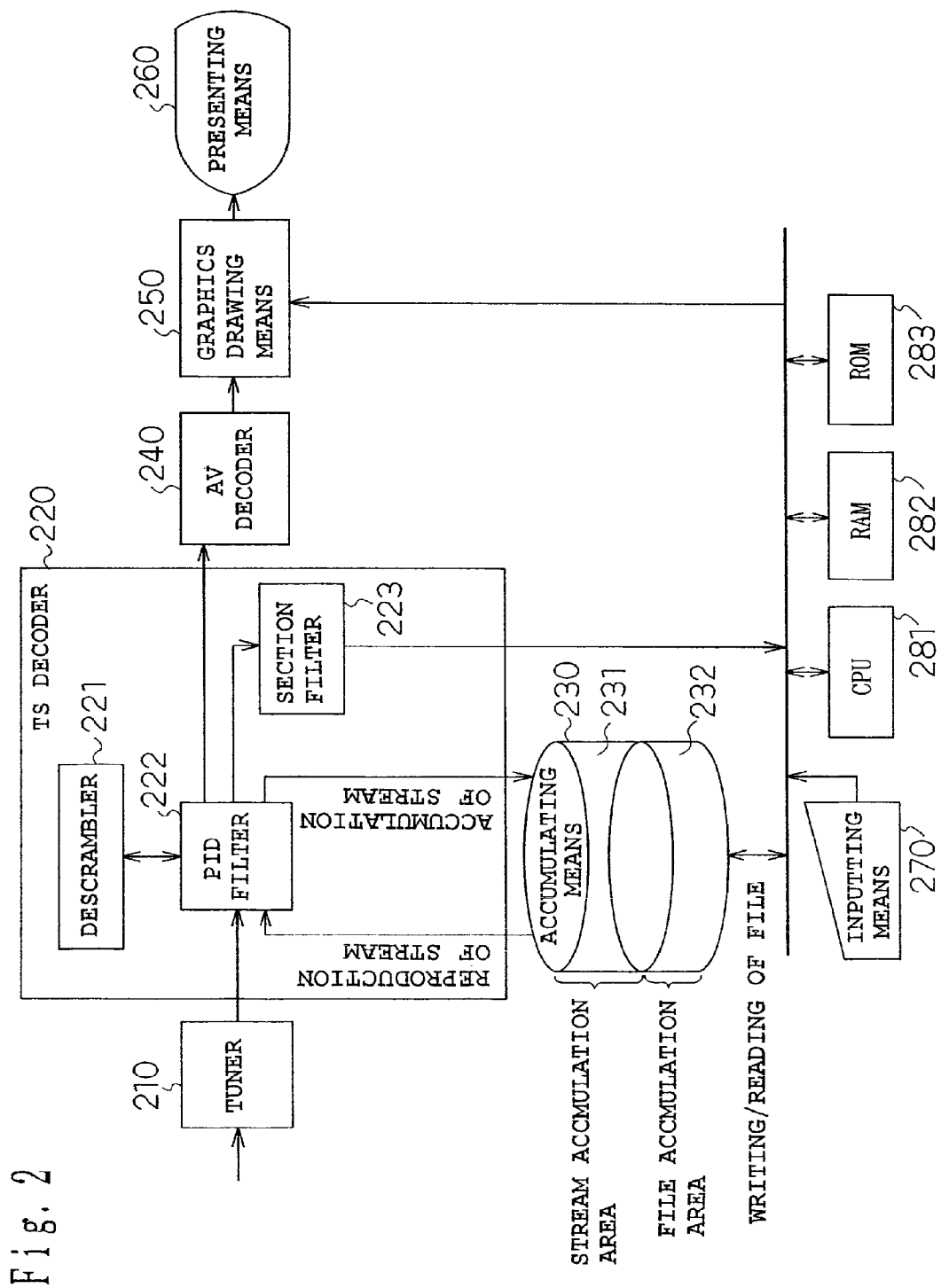
FIG. 2 is a block diagram of a receiving apparatus according to the first preferred embodiment of the present invention.

The details of the receiving apparatuses according to the first preferred embodiment will now be described with reference to FIG. 2. FIG. 2 is a block diagram of the receiving apparatuses according to the first preferred embodiment.

The receiving apparatus according to the present invention comprises the tuner 210, the TS decoder 220, the accumulating means 230, the AV decoder 240, the graphics drawing means 250, the presenting means 260, the inputting means 270, the CPU 281, the RAM 282 and the ROM 283.

Figure 8:
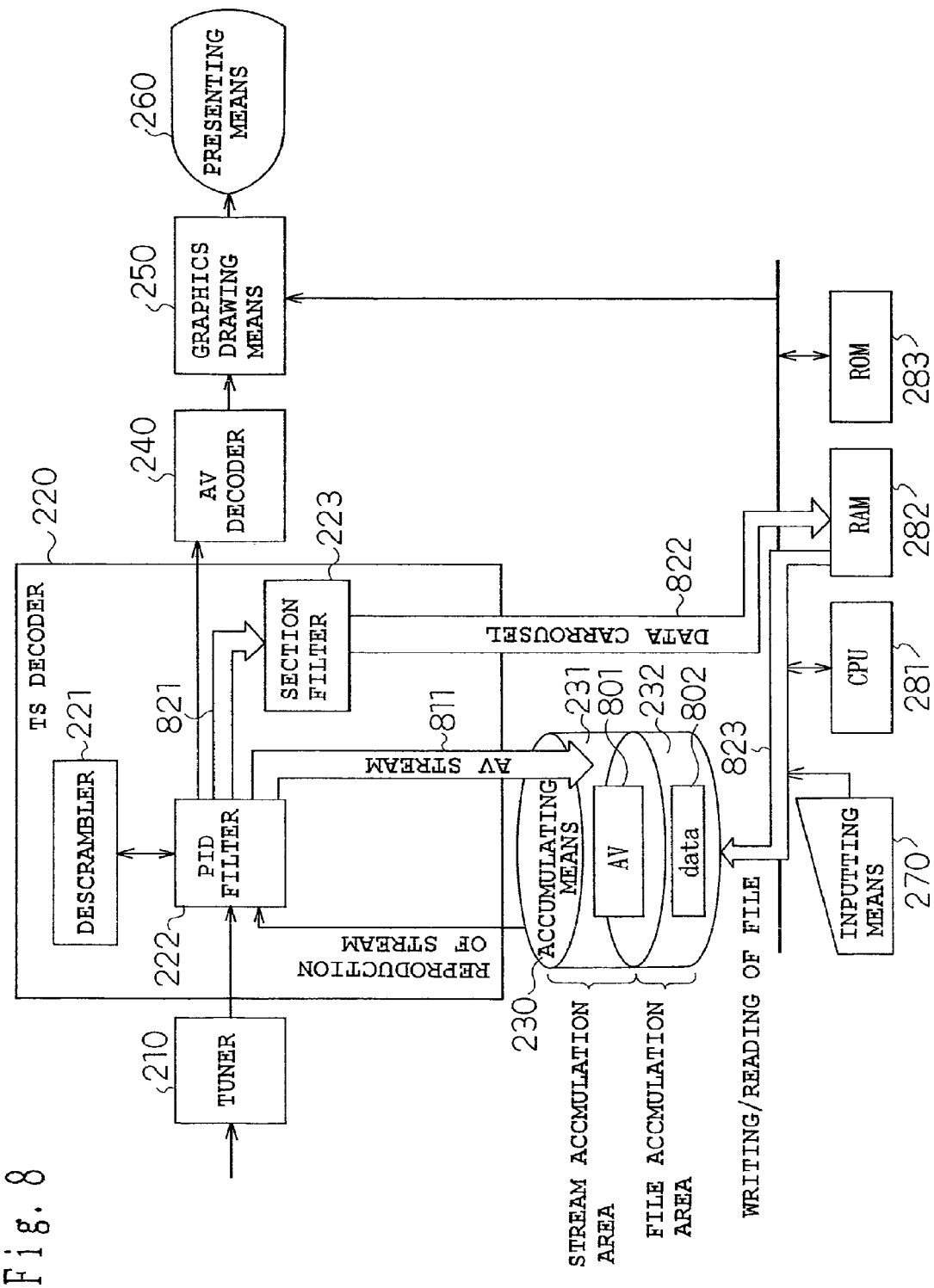
FIG. 8 is an explanatory diagram of a conventional accumulation phase.
Figure 9:
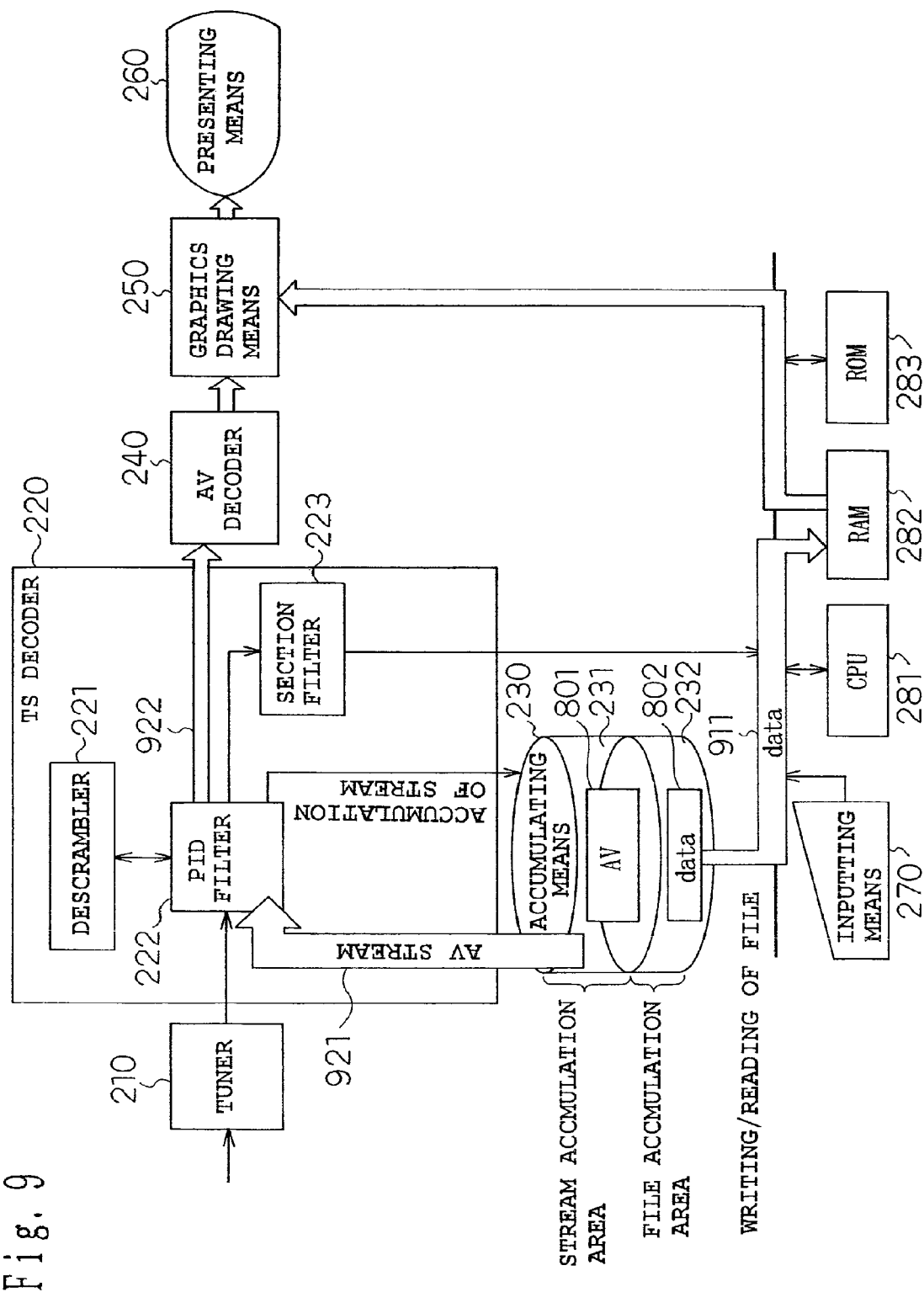
FIG. 9 is an explanatory diagram of a conventional reproduction phase.

Similar hardware may be used, as is apparent from the fact that the same reference symbols as those assigned to the conventional receiving apparatus described with reference to FIG. 8 are used. However, since software is different, a computer program stored in the ROM 283, a data structure stored in the RAM 282 or data stored in the accumulating means 230 for instance is different.

Next, operations in the broadcasting system according to the first preferred embodiment will be described with reference mainly to FIGS. 3 through 7. While describing the operations in the broadcasting system according to the first preferred embodiment, an example of a broadcasting method (a receive accumulating method and a sending method) according to the present invention will be concurrently described.

The operations and flow charts for realizing the operations will now be described, instead of directly describing these programs or data structures.

Figure 3:
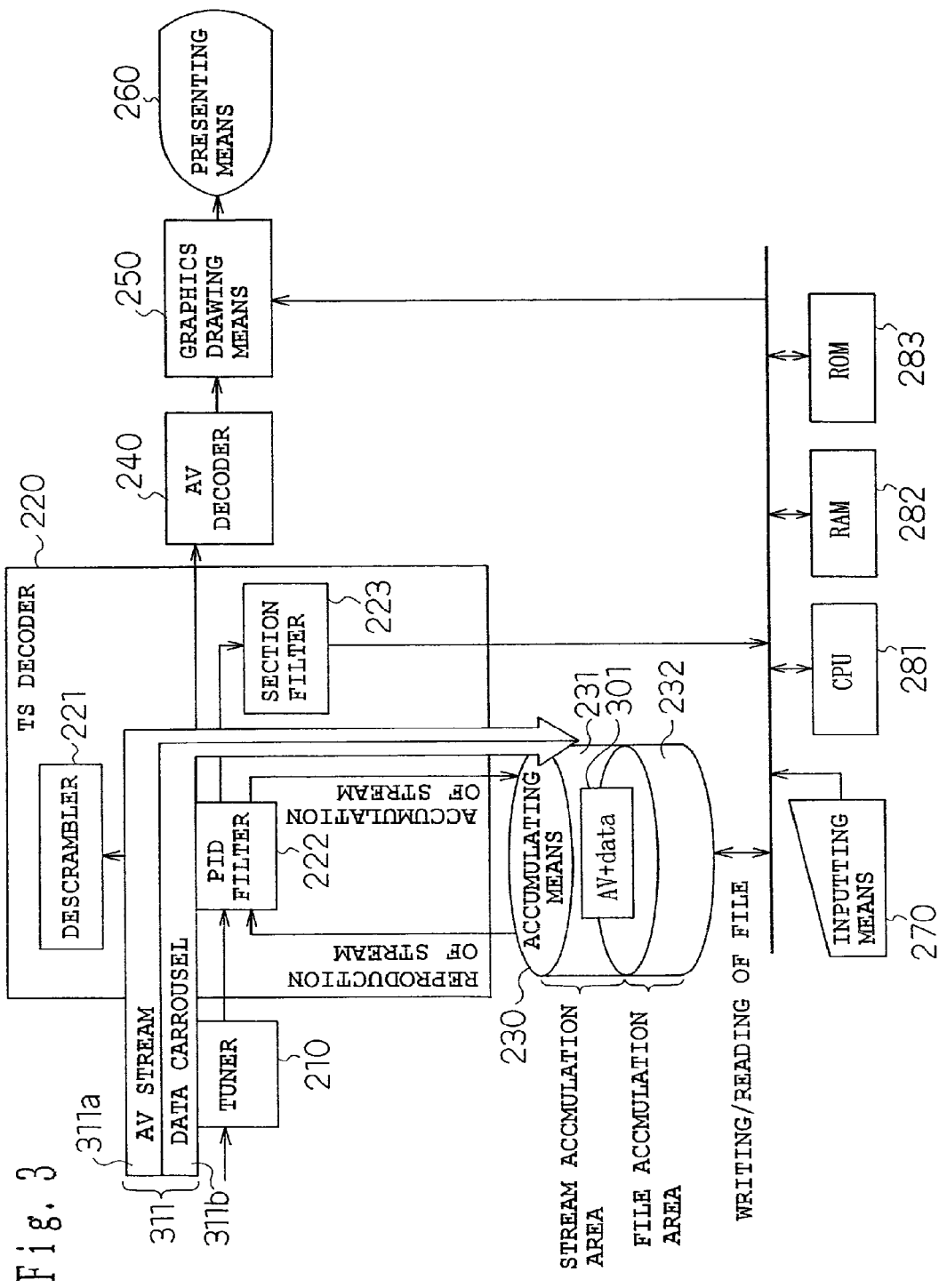
FIG. 3 is an explanatory diagram of an accumulation phase in the first preferred embodiment of the present invention.

FIG. 3 is an explanatory diagram of an accumulation phase in the receiving apparatus according to the first preferred embodiment. Illustrated in this drawing is processing in which at the same time with transmission of video and speech which constitute a cumulative broadcast, data of a data carrousel for communication of data content, meta data or the like are transmitted and the data are received by and accumulated in the receiving apparatus.

As denoted at the arrow 311, a PID corresponding to an AV stream 311a and data 311b of the data carrousel is set up in the PID filter 222 and outputted as one MPEG2-TS to the accumulating means 230, and the AV stream 311a and the data 311b of the data carrousel as they are multiplexed with each other are accumulated during transmission as a stream 301 within the stream accumulation area 231.

Although it is usual that data of a data carrousel are stored in the RAM 282 via the section filter 223 from the PID filter 222 so that the data will be stored as file in the file accumulation area 232, in this example, the data are accumulated as a stream.

In other words, although writing in the stream accumulation area 231 is simultaneous with writing in the file accumulation area 232 at the accumulation phase according to the conventional techniques, only writing of a stream is executed according to the present invention. This obviates simultaneous occurrence of writing of a file which will otherwise obstruct writing of a stream, and hence allows the accumulating means to accumulate data with a margin for the purpose of receiving processing which needs be in real time.

While the streams 301 in which video and speech and a data carrousel are multiplexed with each other are accumulated in the stream accumulation area, a stream as it directly is does not permit interpretation of meta data contained in a data carrousel or reproduction of data content.

Noting this, at the delayed decoding phase, a data carrousel is developed as post-processing after the accumulation phase and a file is accordingly decoded. The post-processing may complete until reproduction of cumulative broadcasting.

Figure 4:
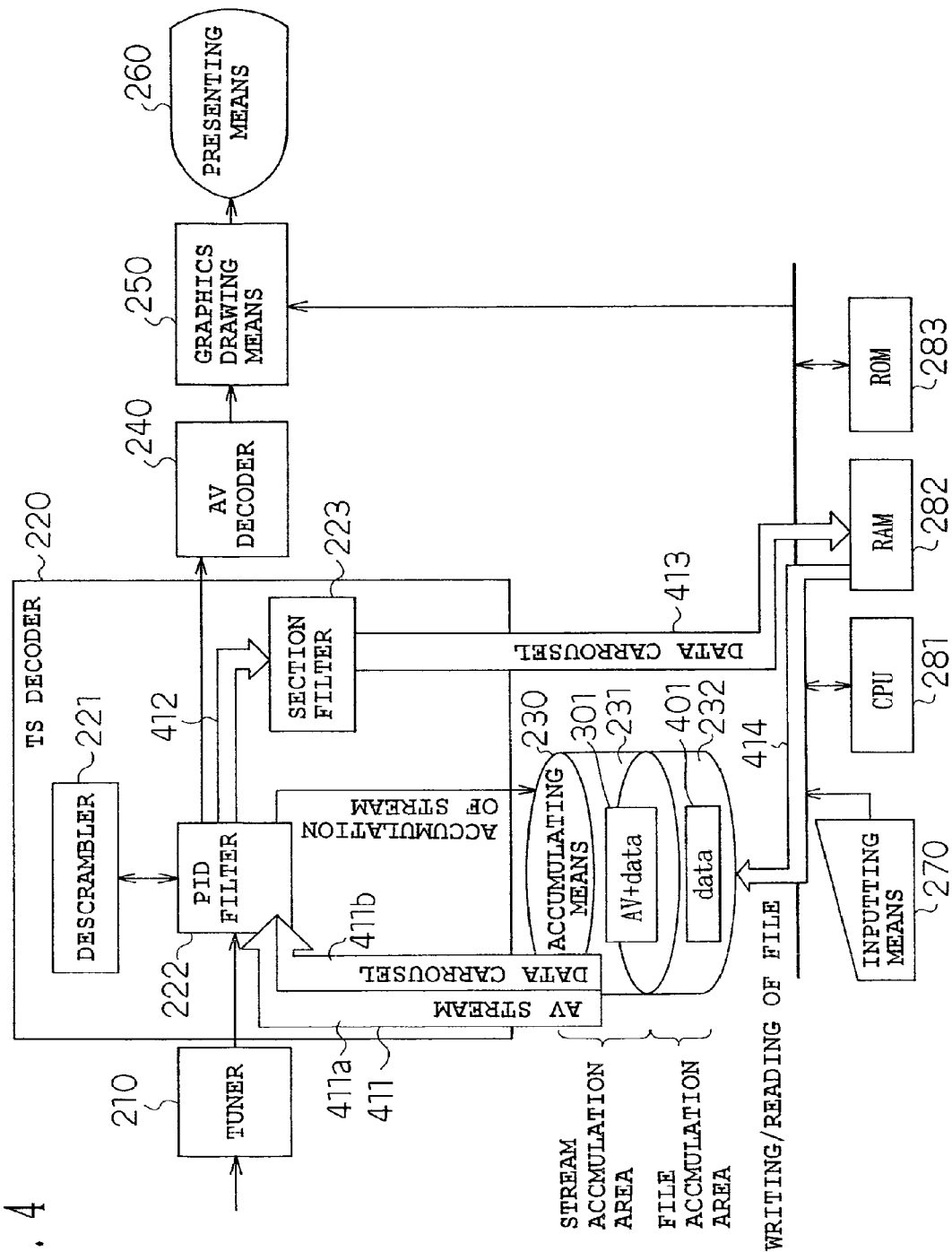
FIG. 4 is an explanatory diagram of a delayed decoding phase in the first preferred embodiment of the present invention.

FIG. 4 is an explanatory diagram of a delayed decoding phase in the receiving apparatus according to the first preferred embodiment.

First, as denoted at the arrow 411, the accumulating means 230 outputs the stream 301 accumulated in the stream accumulation area 231. The stream contains an AV stream 411a and data 411b of a data carrousel.

The PID filter 222 designates a PID which corresponds to a data carrousel, and only data carrousel 412 is outputted.

This is stored in the RAM 282 via the section filter 223, and the CPU 281 decodes the data carrousel. This is then accumulated in the file accumulation area 232 as a file 401 as denoted at the arrow 414.

Since the speed of outputting the accumulated stream 301 from the accumulating means can be freely designated for the post-processing, the receiving apparatus can execute the processing with a processing load within a tolerable range of load without obstructing other processing. In addition, even if the speed of outputting the stream 301 is dynamically changed during the processing, the processing completion time alone changes and exactly the same result will be obtained.

The accumulation phase described with reference to FIG. 3 and the delayed decoding phase described with reference to FIG. 4 will now be described using a flow chart.

Figure 5:
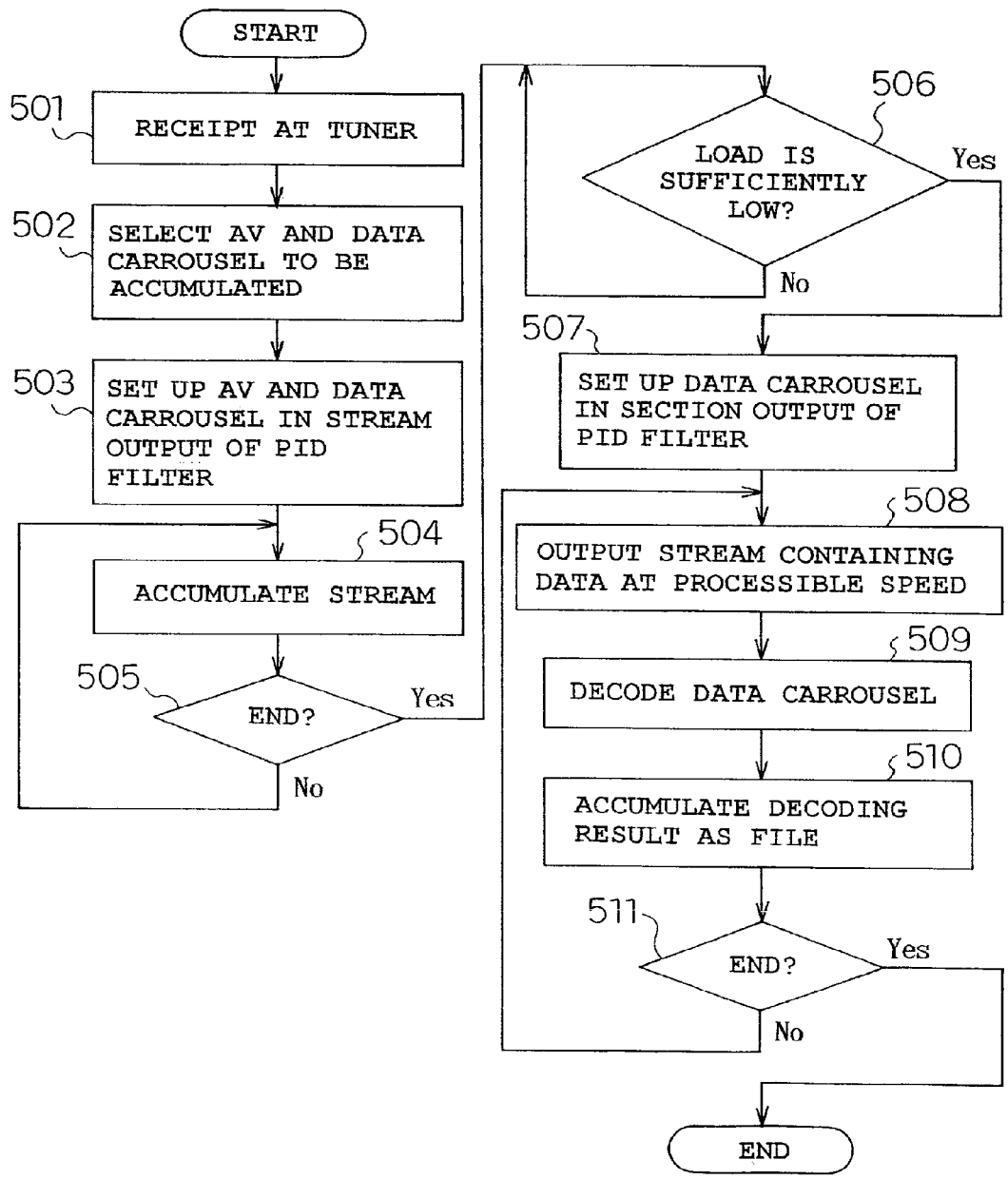
FIG. 5 is a processing flow chart of the accumulation phase and the delayed decoding phase in the first preferred embodiment of the present invention.

FIG. 5 is a processing flow chart of the accumulation phase and the delayed decoding phase in the receiving apparatus according to the first preferred embodiment.

(Step 501) The tuner 210 receives a cumulative broadcast.

(Step 502) The PID of a stream contained in the cumulative broadcast to be accumulated is selected.

A PID is obtained using SI (Service Information) information such as PMT (Program Map Table) sent during broadcasting. A PMT corresponds to programs and contains PIDs which are used for transmission of video, speech, a data carrousel and the like which constitute the respective programs. PMTs and SI are described in ARIB STD-B10 "Service Information for Digital Broadcasting System" by the Association of Radio Industries and Businesses for standardization of digital broadcasting in Japan.

(Step 503) In the PID filter, all values of video, speech and a necessary data carrousel are set up as a PID for a stream output to the accumulating means 230.

(Step 504) As denoted at the arrow 311, a stream which contains both video/speech and a data carrousel is accumulated in the stream accumulation area 231 via the tuner 210 and the PID filter 222.

(Step 505) The step 504 is repeated until accumulation has completed.

The above is a description regarding processing which corresponds to the accumulation phase described with reference to FIG. 3, and processing which corresponds to the delayed decoding phase described with reference to FIG. 4 will now be described.

(Step 506) The sequence waits at the step 506 until a load upon the receiving apparatus becomes sufficiently low.

Which load in which portion this load specifically is differs depending on a bottleneck in the receiving apparatus. For example, the load is calculated from the quality and the quantity of a write/read request to the accumulating means 230.

(Step 507) The PID of the data carrousel is set up in a section output from the PID filter.

(Step 508) The accumulating means 230 causes the streams accumulated in the stream accumulation area 231 to be outputted at a speed which the receiving apparatus can process (This speed may be calculated from the calculation of the load at the step 506.).

(Step 509) A section which transmits the data carrousel is stored in the RAM 282 via the section filter 223, and the CPU 281 decodes the data carrousel.

(Step 510) The result of the decoding is accumulated in the file accumulation area 232 of the accumulating means 230 as a file.

Of course, at this stage, the meta data contained in the data carrousel is interpreted, and the cumulative data are updated, expired data are deleted, or data to be accumulated are selected.

(Step 511) The sequence returns to the step 508 and is repeated until the decoding of the data carrousel completes, and is terminated when there is no stream which contains the data carrousel to be decoded any more.

At last, operations for a case in which a viewer demands reproduction of a cumulative broadcast will be described.

Figure 6:
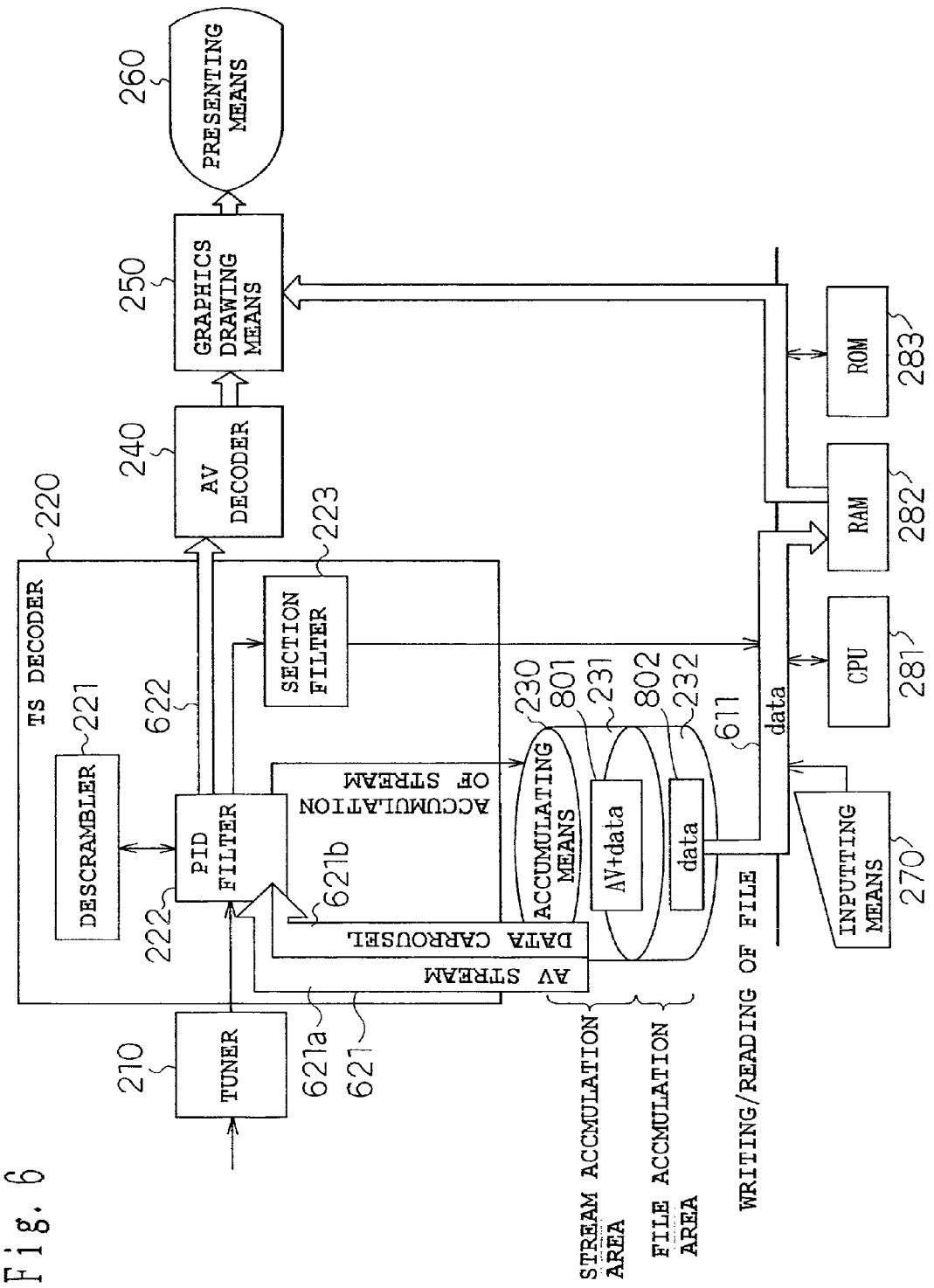
FIG. 6 is an explanatory diagram of a reproduction phase in a receiving apparatus according to the first preferred embodiment of the present invention.

FIG. 6 is an explanatory diagram of a reproduction phase in the receiving apparatus according to the first preferred embodiment.

Here, since a stream accumulated in the stream accumulation area also contains the data carrousel, the operations at the reproduction phase are similar to those at the conventional reproduction phase except that the data carrousel is to be removed using the PID filter 222. Since processing performed by the PID filter 222 does not impose a load upon the CPU 281, when the method according to the present invention is adopted, there can arise no problem to a viewer such that dialogue processing becomes slow during reproduction of a BML document or the like.

In FIG. 6, a file 802 representing data content stored in the file accumulation area 232 is outputted from the accumulating means 230 and then stored in the RAM 282.

The CPU 281 interprets and executes this, whereby the graphics drawing means 250 creates a GUI screen.

As the viewer manipulated thus displayed GUI screen using the inputting means 270, the data content stored in the file 802 is reproduced serially.

As reproduction of video and speech is designated during this, only video and speech are selected by the PID filter 222 from the video and speech stream which contains the data carrousel and is stored in the stream accumulation area 231 of the accumulating means 230 and outputted to the AV decoder 240. Since the video and speech stream fed to the AV decoder is similar to a stream which is sent at a conventional reproduction phase, any particular processing is not necessary.

Figure 7:
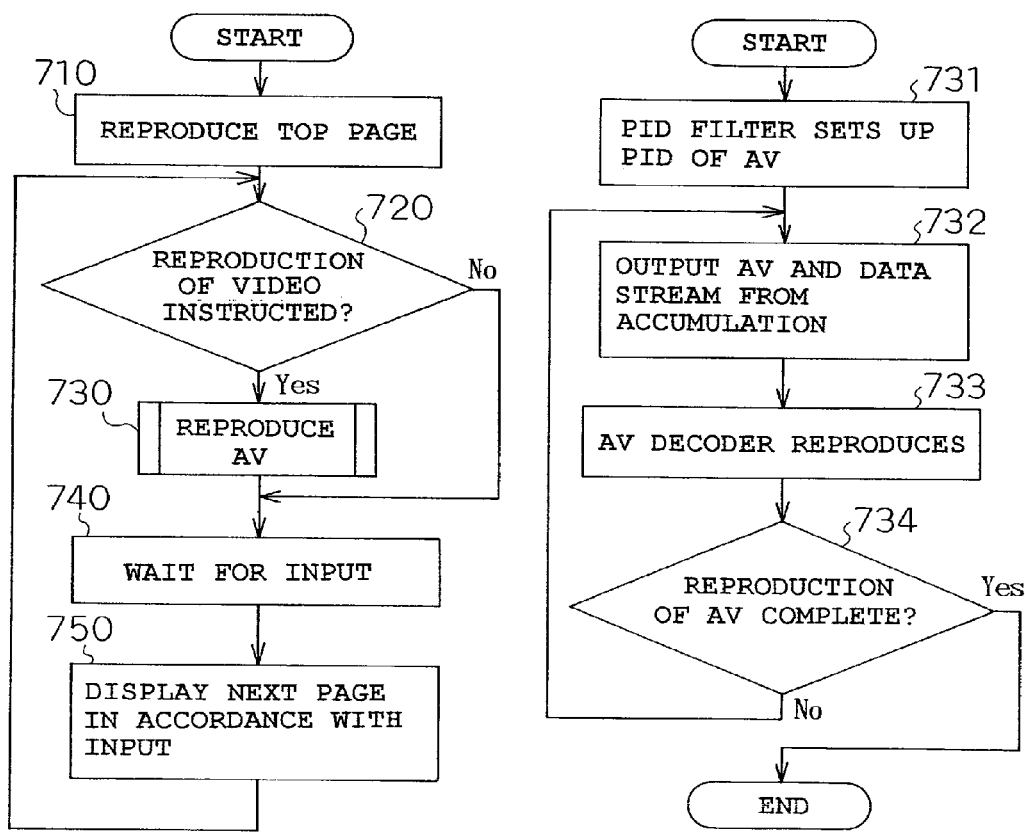
FIG. 7 is a processing flow chart of the reproduction phase in the first preferred embodiment of the present invention.

FIG. 7 is a processing flow chart of the reproduction phase in the receiving apparatus according to the first preferred embodiment.

(Step 710) The CPU interprets in the RAM 282 the BML document which is stored in the file accumulation area 232 and the graphics drawing means 250 creates a GUI screen, whereby a top page which is a page to be displayed first in the BML document is reproduced and displayed.

(Step 720) As the viewer provides an input through the inputting means 270 and accordingly manipulates the GUI screen, reproduction of video is instructed.

(Step 730) Video and speech are reproduced.

The processing at the step 730 will now be divided into steps 731 through 734 and described in detail.

(Step 731) The PID filter 222 designates the PID of video and speech.

(Step 732) The video and speech stream which contains the data carrousel stored in the stream accumulation area 231 is outputted from the accumulating means 230.

(Step 733) The PID filter 222 selects only a TS packet having the PID regarding the video and speech, and the AV decoder 240 reproduces this.

(Step 734) The sequence returns to the step 732 and is repeated until the reproduction of the video and speech completes. As the reproduction finishes, the processing corresponding to the step 730 is terminated.

(Step 740) An input to the inputting means 270 from a viewer is waited.

(Step 750) In accordance with the input, the next page is displayed, and the sequence returns to the step 720.

Although the foregoing has described that meta data, too, are temporarily accumulated in the stream accumulation area 231 as a stream, in the event that meta data are sufficiently smaller than data content or the number of files is small, meta data alone may be stored in the RAM 282 via the section filter 223 at a receiving phase and decoded on the spot.

Even in this case, data content is accumulated in the stream accumulation area 231 as a stream. Similar processing is executed except for that only data content in the data carrousel is decoded at the delayed decoding phase.

In the receiving apparatus, the receive accumulating method according to the present invention and a conventional receive accumulating method may be used in combination. For instance, the receive accumulating method according to the present invention may be used in a situation that it is already predictable that processing by the accumulating means 230 would not be in time because of reserved recording, while a conventional receive accumulating method may be used in a situation that it is already predictable processing by the accumulating means 230 would be in time.

Advantages of the conventional techniques are that it is possible to reproduce right upon completion of receiving and that the power source of the receiving apparatus may be turned off right upon completion of receiving. These advantages can be utilized if the conventional method is automatically used together.

In addition, even when a viewer suddenly starts recording or otherwise suddenly causes the accumulating means 230 not to process in time during execution of the conventional method, the sequence may shift to the data accumulation method according to the present invention in the middle of accumulation.

Conversely, in the event that the data accumulation method according to the present invention is initiated but reserved recording ends during execution of the data accumulation method according to the present invention so that processing by the accumulating means 230 would be in time, from that time onward, the sequence may automatically shift to the conventional method.

Although the foregoing has described that a writing area on the cumulative medium are separated into physical/logical ones for streams and files, even when a writing area is not divided into physical/logical ones, if streams and files are to be accumulated on the same cumulative medium, file writing during stream writing obstructs the stream writing, and therefore, a similar problem arises if not to the same extent. The data accumulation method according to the present invention is directly applicable to such a situation as well.

Further, in the event that the accumulating means comprises IEEE1394, which is widely used for data transfer between digital AV equipments, as an interface, accumulation of streams may be realized by means of isochronous transfer according to IEEE1394 and files may be written through asynchronous transfer according to IEEE1394. When asynchronous transfer is executed during isochronous transfer, a processing speed for transmission through isochronous transfer slows down and a similar problem occurs. The data accumulation method according to the present invention is directly applied to solve a problem associated with IEEE1394.

Further, although the foregoing has described that a cumulative broadcast is provided via a BS satellite, a cumulative broadcast can be provided independently of propagating means. For instance, the present invention is directly applicable to terrestrial digital broadcasting and broadcasting utilizing digital cable television sets or a multicast technique on the Internet.

The first preferred embodiment has been described in detail above.

The receive accumulating apparatuses according to the present invention are the receiving apparatuses 131 through 133 (See FIG. 1.) in the preferred embodiment above. However, this is not limiting. The receive accumulating apparatus according to the present invention is a receive accumulating apparatus which receives and temporarily accumulates stream-format data and file-format data sent as they are multiplexed from a sending apparatus which multiplexes stream-format data based on a stream transmission protocol and file-format data based on a file transmission protocol and sends them as a single stream, and the stream-format data and the file-format data are temporarily accumulated as a single stream and all or some of the file-format data are reproduced later at predetermined timing and accumulated once again as a file in the receive accumulating apparatus.

The sending apparatus according to the present invention is the transmission apparatus 110 (See FIG. 1.) in the preferred embodiment above. However, this is not limiting. The sending apparatus according to the present invention is a sending apparatus which multiplexes stream-format data based on a stream transmission protocol and file-format data based on a file transmission protocol with each other and sends them as a single stream, and a receive accumulating apparatus of receiving and temporarily accumulating stream-format data and file-format data which are multiplexed and sent and temporarily accumulates the stream-format data and the file-format data directly as a single stream, reproduces all or some of the file-format data later at predetermined timing and accumulates once again as a file.

The broadcasting system according to present invention is the broadcasting system 100 (See FIG. 1.) in the preferred embodiment above. However, this is not limiting. The broadcasting system according to present invention is a broadcasting system which comprises a sending apparatus of multiplexing stream-format data based on a stream transmission protocol and file-format data based on a file transmission protocol with each other and sending them as a single stream, and a receive accumulating apparatus of receiving and temporarily accumulating stream-format data and file-format data which are multiplexed and sent, in which stream-format data and file-format data are temporarily accumulated as a single stream and all or some of the file-format data are reproduced later at predetermined timing and accumulated once again as a file.

The present invention is also directed to a program which operates working together with a computer and makes the computer execute the functions of all or some means (or apparatuses, elements, circuits, portions, etc.) of the receive accumulating apparatus, the sending apparatus and the broadcasting system according to present invention. Of course, a computer referred to in the present invention is not limited to pure hardware, such as a CPU, but may include firmware, OS and even peripheral equipments.

The present invention is also directed to a program which operates working together with a computer and makes the computer execute operations at all or some steps (or processes, operations, functions, etc.) of the receive accumulating method, the sending method and the broadcasting method according to present invention.

Some means (or apparatuses, elements, circuits, portions, etc.) according to present invention and some steps (or processes, operations, functions, etc.) according to present invention refer to some of means or steps among these plurality of means or steps, or alternatively, some functions or operations of one means or step.

Some apparatuses (or elements, circuits, portions, etc.) according to present invention refer to some of apparatuses among these plurality of apparatuses, or some of means (or elements, circuits, portions, etc.) within one apparatus, or some of functions within one means.

The present invention also covers a recording medium which holds a program according to present invention and which can be read on a computer. One embodiment of a program according to present invention may be that the program is recorded on a recording medium which can be read on a computer and which operates working together with the computer. Alternatively, one embodiment of a program according to present invention may be that the program is transmitted through a transmission medium, read on a computer and operates working together with the computer. Recording mediums include a ROM and the like, while transmission mediums include such a transmission medium like the Internet, light, an electric wave, a sound wave, etc.

The structure according to present invention may be realized by hardware, or alternatively, by software.

The present invention is also directed to a medium which carries a program which makes a computer execute all or some functions of some or all means of the receive accumulating apparatus, the sending apparatus and the broadcasting system according to present invention, so that the program which can be read on a computer and is read on a computer would operate working together with the computer and the functions would be executed.

The present invention is also directed to a medium which carries a program which makes a computer execute all or some operations at all or some steps in the receive accumulating method, the sending method and the broadcasting method according to present invention, so that the program which can be read on a computer and is read on a computer would operate working together with the computer and the operations would be executed.

As described above, the present invention is directed to a data accumulation method which comprises a step 1 of receiving video and/or speech and cumulative data and accumulating as a stream in a cumulative medium, a step 2 of extracting and decoding cumulative data from the accumulated stream and accumulating data content in thus decoded cumulative data on a cumulative medium as a file, a step 3 of interpreting meta data in the cumulative data decoded at the step 2 and controlling the accumulated content of the cumulative medium, and a step 4 of extracting and reproducing video and/or speech from the stream when there is a request for reproduction of video and/or speech.

More specifically, in a cumulative broadcasting system which comprises a sending apparatus, which sends video and/or speech through a stream transmission protocol and cumulative data consisting of data content and meta data through a file transmission protocol, and a receiving apparatus, which does thus received video and/or speech and thus received data content and controls accumulation on a cumulative medium by interpreting thus received meta data, and reproduces the video and/or speech and the data content stored on the cumulative medium in accordance with a reproduction request, the present invention is directed to a data accumulation method which comprises a step 1 of receiving the video and/or speech and the cumulative data and accumulating on the cumulative medium as a stream, a step 2 of extracting and decoding the cumulative data from the accumulated stream and accumulating data content in thus decoded cumulative data on the cumulative medium as a file, a step 3 of interpreting the meta data in the cumulative data decoded at the step 2 and controlling the accumulated content of the cumulative medium, and a step 4 of extracting and reproducing video and/or speech from the stream when there is a request for reproduction of the video and/or speech.

Further, for example, in a cumulative broadcasting system which comprises a sending apparatus, which sends video and/or speech through a stream transmission protocol and cumulative data consisting of data content and meta data through a file transmission protocol, and a receiving apparatus, which does thus received video and/or speech and thus received data content and controls accumulation on a cumulative medium by interpreting thus received meta data, and reproduces the video and/or speech and the data content stored on the cumulative medium in accordance with a reproduction request, the present invention is directed to a data accumulation method which comprises a step 1 of receiving the video and/or speech and the cumulative data and accumulating the video and/or speech and the data content in the cumulative data on the cumulative medium as a stream, a step 2 of decoding the meta data in the received cumulative data and storing in a main memory, a step 3 of extracting and decoding the data content from the accumulated stream and accumulating thus decoded data content on the cumulative medium as a file, a step 4 of interpreting the meta data decoded at the step 2 and controlling the accumulated content of the cumulative medium, and a step 5 of extracting and reproducing video and/or speech from the stream when there is a request for reproduction of the video and/or speech.

For instance, the present invention is directed to the data accumulation method above which is characterized in that at the step of extracting and decoding the cumulative data from the accumulated stream, a speed of outputting streams from the cumulative medium is limited within a range in which the receiving apparatus can perform processing.

For instance, the present invention is directed to the data accumulation method above which is characterized in that the stream transmission protocol above is MPEG-2TS, the file transmission protocol above is a DSM-CC data carrousel, streams are written on the cumulative medium through isochronous transfer according to IEEE1394, and files are written on the cumulative medium through asynchronous transfer according to IEEE1394.

Further, for example, in a cumulative broadcasting system which comprises a sending apparatus, which sends video and/or speech through a stream transmission protocol and cumulative data consisting of data content and meta data through a file transmission protocol, and a receiving apparatus, which does thus received video and/or speech and thus received data content and controls accumulation on a cumulative medium by interpreting thus received meta data, and reproduces the video and/or speech and the data content stored on the cumulative medium in accordance with a reproduction request, the present invention is directed to a receiving apparatus which comprises a tuner and a PID filter in a structure of the receiving apparatus, wherein the tuner receives the video and/or speech and the cumulative data and sends them to the PID filter, the PID filter extracts through filtering the video and/or speech and the cumulative data when there is an input received from the tuner, the extraction result of the filtering is accumulated in the cumulative medium, the cumulative medium outputs thus accumulated data to the PID filter upon completion of accumulation, the cumulative data are extracted when the PID filter receives the video and/or speech and the cumulative data from the cumulative medium, the CPU decodes the cumulative data extracted by the accumulating means and the accumulating means accumulates this while the meta data in thus decoded cumulative data are interpreted so that the accumulated content of the cumulative medium is controlled, and when there is a request for reproduction of the video and/or speech, the accumulating means outputs a stream containing thus accumulated video and/or speech and thus accumulated cumulative data and the PID filter extracts the video and/or speech.

Further, for example, in a cumulative broadcasting system which comprises a sending apparatus, which sends video and/or speech through a stream transmission protocol and cumulative data consisting of data content and meta data through a file transmission protocol, and a receiving apparatus, which does thus received video and/or speech and thus received data content and controls accumulation on a cumulative medium by interpreting thus received meta data, and reproduces the video and/or speech and the data content stored on the cumulative medium in accordance with a reproduction request, the present invention is directed to a receiving apparatus which comprises a tuner, a PID filter, a cumulative medium and a CPU in a structure of the receiving apparatus, wherein the tuner receives the video and/or speech and the cumulative data and sends them to the PID filter, the PID filter extracts through filtering a pair of the video and/or speech and the data content and the meta data when there is an input received from the tuner, a pair of the video and/or speech and the data content extracted through filtering is accumulated in the cumulative medium, the cumulative medium outputs thus accumulated data to the PID filter upon completion of accumulation, the data content is extracted when the PID filter receives the video and/or speech and the data content from the cumulative medium, the CPU decodes the data content extracted by the accumulating means and the accumulating means accumulates this while the PID filter interprets thus extracted meta data so that the accumulated content of the cumulative medium is controlled, and when there is a request for reproduction of the video and/or speech, the accumulating means outputs a stream containing thus accumulated video and/or speech and thus accumulated cumulative data and the PID filter extracts the video and/or speech.

Further, for instance, the present invention is directed to the data accumulation method above which is characterized in that at the stage of extracting and decoding the cumulative data from the accumulated stream, a speed of outputting streams from the cumulative medium is limited within a range in which the receiving apparatus can perform processing.

Further, for instance, the present invention is directed to the receiving apparatus above which is characterized in that the stream transmission protocol is MPEG-2TS, streams are written on the cumulative medium through isochronous transfer according to IEEE1394, and files are written on the cumulative medium through asynchronous transfer according to IEEE1394.

Further, for example, the present invention is directed to a cumulative broadcasting system for implementing the data accumulation method above.

Hence, according to present invention, even when there is not a processing capacity to simultaneously write a stream representing video and/or speech and write a file representing data content, as data content is multiplexed with video and/or speech as a stream, the video and/or speech and the data content are accumulated as single stream. Since this reduces a processing load, real time performance is easily guaranteed at the accumulation phase.

In addition, real time performance is not demanded for post-processing at the delayed decoding phase, it is possible to decode data content from data which are accumulated within a low processing load range without obstructing other processing performed by the receiving apparatus and to accumulate as a file.

This function not only allows to select an optimal processing speed under the current situation even when processing by a hard disk is slowed down by reserved recording of other program, or even if a load upon the CPU is great because of other calculation, or even if real time processing is demanded during dialogue-based processing initiated by a viewer, but also permits to dynamically change the processing speed even during post-processing.

Further, for reproduction of accumulated data content, it is possible to receive the same video/speech stream as that for the conventional method as viewed from the AV decoder only if the data content is removed by the PID filter. Since the processing by the PID filter is independent of the CPU, there is no extra load imposed upon the CPU at this stage.

To be particularly noted, a stream containing a data carrousel once accumulated is not converted into a stream which contains only video and speech but does not contain a data carrousel either at the accumulation phase, the delayed decoding phase or the reproduction phase. Since the processing of converting a stream which contains video and speech accompanies processing of a very large volume of data, it is assumed that a very large load will be imposed upon the accumulating means, however, such a large load will not arise according to the present invention.

Every one of these processing described above does not require a conventional receiving apparatus to additionally comprise special hardware, and further reduces a load upon the CPU upon request of processing by the cumulative medium, such as a hard disk, and receipt.

Because of this, it is possible to use a CPU, a hard disk and the like which are of low-performance but are inexpensive. Further, by means of a function of so-called software download for upgrading the software of the receiving apparatus through broadcasting, it is possible to expand the functions of a conventional receiving apparatus to the functions of the receiving apparatus according to the present invention.

Still further, as the processing according to the present invention is carried out only when there is a large processing load and conventional processing is otherwise executed, the receiving apparatus is energized in a short period of time, thereby contributing to conservation of electric power.

In addition, since it is not necessary at all to change data to send from the sending apparatus installed in a broadcasting station, a conventional receiving apparatus and the receiving apparatus according to the present invention may coexist, which allows to introduce the receiving apparatus according to the present invention without changing a conventional receiving apparatus.

The entire disclosure of the literature mentioned above is incorporated herein by reference in its entirety.

INDUSTRIAL APPLICABILITY

As clearly described above, the present invention is advantageous in that it is possible to realize an inexpensive cumulative broadcasting service without missing some of data content, meta data and video and speech or adversely influencing other data processing.

The invention claimed is:

1. A receive accumulating apparatus configured to receive i) at least one of video and speech data and ii) file-format data which are sent as they are multiplexed with each other from the side of a sending apparatus, which multiplexes i) at least one of video and speech data encoded based on a stream transmission protocol and ii) file-format data encoded based on a file transmission protocol with each other and sends i) at least one of said video and speech data and ii) said file-format data as a single stream, and temporarily accumulating, in a predetermined accumulation area, i) at least one of said video and speech data and ii) said file-format data as they directly are in the form of a single stream,
  wherein all or some of said file-format data are decoded later at predetermined timing and accumulated in another accumulation area, which is different from said predetermined accumulation area, once again as a file,
  i) at least one of said video and speech data and ii) said file-format data which are temporarily accumulated in said predetermined accumulation area as a single stream are reproduced by utilizing all or some of said file-format data which are accumulated in said another accumulation area once again,
  a PID filter capable of performing separation of i) at least one of said video and speech data and ii) said file-format data is utilized,
  a PID corresponding to at least one of said video and speech data and a PID corresponding to said file-format data are set up in order for said PID filter not to perform said separation so that i) at least one of said video and speech data and ii) said file-format data are both passed through the PID filter without being filtered to be temporarily accumulated directly in the form of a single stream, in said predetermined accumulation area, and
  said PID corresponding to said file-format data is set up in order for said PID filter to perform said separation so that said all or some of said file-format data are decoded later at said predetermined timing, when a load upon the receive accumulating apparatus becomes smaller than a predetermined value after i) at least one of said video and speech data and ii) said file-format data have been accumulated in said predetermined accumulation area, and accumulated in said another accumulation area once again as a file.

2. The receive accumulating apparatus of claim 1, wherein i) at least one of said video and speech data and ii) said file-format data which are temporarily accumulated in said predetermined accumulation area as a single stream are reproduced by utilizing at least one of said video and speech data which are extracted from said single stream.

3. The receive accumulating apparatus of claim 1, wherein said predetermined timing is such timing which does not obstruct predetermined data processing which needs in real time.

4. The receive accumulating apparatus of claim 1, wherein decoding of all or some of said file-format data is executed at a predetermined processing speed.

5. The receive accumulating apparatus of claim 1, wherein said file-format data contain meta data,
  there is a temporary memory which temporarily stores said meta data, and
  said meta data are stored in said temporary memory after decoded at said predetermined timing as said file-format data, and used for management of said data which are accumulated.

6. The receive accumulating apparatus of any one of claims 1 through 5, wherein (1) accumulation of i) at least one of said video and speech data and ii) said file-format data which are to be temporarily accumulated as a single stream and (2) accumulation of all or some of said file-format data which are to be decoded and accumulated once again as a file are executed using accumulation areas which are at least physically or logically different from each other.

7. The receive accumulating apparatus of claim 6, wherein said stream transmission protocol is at least one of MPEG Video and MPEG Audio, said file transmission protocol is a DSM-CC data carrousel, and the format of said single stream is MPEG-2TS.

8. The receive accumulating apparatus of claim 7, wherein temporary accumulation of i) at least one of said video and speech data and ii) said file-format data as a single stream is carried out through isochronous transfer according to IEEE1394, and re-accumulation of all or some of said file-format data as a file is carried out through asynchronous transfer according to IEEE1394.

9. A broadcasting system which comprises:

a sending apparatus which multiplexes i) at least one of video and speech data encoded based on a stream transmission protocol and ii) file-format data encoded based on a file transmission protocol with each other and sends i) at least one of said video and speech data and ii) said file-format data as a single stream; and a receive accumulating apparatus which receives i) at least one of said video and speech data and ii) said file-format data which are sent as multiplexed with each other and temporarily accumulates, in a predetermined accumulation area, i) at least one of said video and speech data and ii) said file-format data as they directly are in the form of a single stream, wherein all or some of said file-format data are decoded later at predetermined timing and accumulated in another accumulation area, which is different from said predetermined accumulation area, once again as a file, i) at least one of said video and speech data and ii) said file-format data which are temporarily accumulated in said predetermined accumulation area as a single stream are reproduced by utilizing all or some of said file-format data which are accumulated in said another accumulation area once again, a PID filter capable of performing separation of i) at least one of said video and speech data and ii) said file-format data is utilized, a PID corresponding to at least one of said video and speech data and a PID corresponding to said file-format data are set up in order for said PID filter not to perform said separation so that i) at least one of said video and speech data and ii) said file-format data are both passed through said PID filter without being filtered to be temporarily accumulated directly in the form of a single stream, in said predetermined accumulation area, and said PID corresponding to said file-format data is set up in order for said PID filter to perform said separation so that said all or some of said file-format data are decoded later at said predetermined timing, when a load upon the receive accumulating apparatus becomes smaller than a predetermined value after i) at least one of said video and speech data and ii) said file-format data have been accumulated in said predetermined accumulation area, and accumulated in said another accumulation area once again as a file.

10. A receive accumulating method, comprising:

an accumulating step of receiving i) at least one of video and speech data and ii) file-format data which are sent as multiplexed with each other from the side of a sending apparatus, which multiplexes i) at least one of video and speech data encoded based on a stream transmission protocol and ii) file-format data encoded based on a file transmission protocol with each other and sends i) at least one of said video and speech data and ii) said file-format data as a single stream, and temporarily accumulating, in a predetermined accumulation area, i) at least one of said video and speech data and ii) said file-format data as they directly are in the form of a single stream;

a decoding step of decoding all or some of said file-format data later at predetermined timing and accumulating in another accumulation area, which is different from said predetermined accumulation area, said all or some of said file-format data once again as a file; and a reproducing step of reproducing i) at least one of said video and speech data and ii) said file-format data which are temporarily accumulated in said predetermined accumulation area as a single stream by utilizing all or some of said file-format data which are accumulated in said another accumulation area once again, wherein a PID filter capable of performing separation of i) at least one of said video and speech data and ii) said file-format data is utilized, a PID corresponding to at least one of said video and speech data and a PID corresponding to said file-format data are set up in order for said PID filter not to perform said separation so that i) at least one of said video and speech data and ii) said file-format data are both passed through said PID filter without being filtered to be temporarily accumulated directly in the form of a single stream, in said predetermined accumulation area, and said PID corresponding to said file-format data is set up in order for said PID filter to perform said separation so that said all or some of said file-format data are decoded later at said predetermined timing, when a load upon the receive accumulating apparatus becomes smaller than a predetermined value after i) at least one of said video and speech data and ii) said file-format data have been accumulated in said predetermined accumulation area, and accumulated in said another accumulation area once again as a file.

11. A broadcasting method, comprising:

a sending step of multiplexing i) at least one of video and speech data encoded based on a stream transmission protocol and ii) file-format data encoded based on a file transmission protocol with each other and sending i) at least one of said video and speech data and ii) said file-format data as a single stream;

an accumulating step of receiving i) at least one of said video and speech data and ii) said file-format data which are sent as multiplexed with each other and temporarily accumulating, in a predetermined accumulation area, i) at least one of said video and speech data and ii) said file-format data as they directly are in the form of a single stream;

a decoding step of decoding all or some of said file-format data later at predetermined timing and accumulating in another accumulation area, which is different from said predetermined accumulation area, said all or some of said file-format data once again as a file; and a reproducing step of reproducing i) at least one of said video and speech data and ii) said file-format data which are temporarily accumulated in said predetermined accumulation area as a single stream by utilizing all or some of said file-format data which are accumulated in said another accumulation area once again, wherein a PID filter capable of performing separation of i) at least one of said video and speech data and ii) said file-format data is utilized, a PID corresponding to i) at least one of said video and speech data and a PID corresponding to said file-format data are set up in order for said PID filter not to perform said separation so that i) at least one of said video and speech data and ii) said file-format data are both passed through said PID filter without being filtered to be temporarily accumulated directly in the form of a single stream, in said predetermined accumulation area, and said PID corresponding to said file-format data is set up in order for said PID filter to perform said separation so that said all or some of said file-format data are decoded later at said predetermined timing, when a load upon the receive accumulating apparatus becomes smaller than a predetermined value after i) at least one of said video and speech data and ii) said file-format data have been accumulated in said predetermined accumulation area, and accumulated in said another accumulation area once again as a file.

12. A non-transitory computer-readable recording medium configured to record a program, which program causes a computer to act as the accumulating step of receiving i) at least one of video and speech data and ii) file-format data which are sent as multiplexed with each other from the side of a sending apparatus, which multiplexes i) at least one of video and speech data encoded based on a stream transmission protocol and ii) file-format data encoded based on a file transmission protocol with each other and sends i) at least one of said video and speech data and ii) said file-format data as a single stream, and temporarily accumulating, in a predetermined accumulation area, i) at least one of said video and speech data and ii) said file-format data as they directly are in the form of a single stream, to act as the decoding step of decoding all or some of said file-format data later at predetermined timing and accumulating in another accumulation area, which is different from said predetermined accumulation area, said all or some of said file-format data once again as a file, and to act as the reproducing step of reproducing i) at least one of said video and speech data and ii) said file-format data which are temporarily accumulated in said predetermined accumulation area as a single stream by utilizing all or some of said file-format data which are accumulated in said another accumulation area once again, in the receive accumulating method according to claim 10.

13. A non-transitory computer-readable recording medium configured to record a program, which program causes a computer to act as the sending step of multiplexing i) at least one of video and/or speech data encoded based on a stream transmission protocol and ii) file-format data encoded based on a file transmission protocol with each other and sending i) at least one of said video and speech data and ii) said file-format data as a single stream, to act as the accumulating step of receiving i) at least one of said video and speech data and ii) said file-format data which are sent as multiplexed with each other and temporarily accumulating, in a predetermined accumulation area, i) at least one of said video and speech data and ii) said file-format data as they directly are in the form of a single stream, to act as the decoding step of decoding all or some of said file-format data later at predetermined timing and accumulating in another accumulation area, which is different from said predetermined accumulation area, said all or some of said file-format data once again as a file, and to act as the reproducing step of reproducing i) at least one of said video and speech data and ii) said file-format data which are temporarily accumulated in said predetermined accumulation area as a single stream by utilizing all or some of said file-format data which are accumulated in said another accumulation area once again, in the broadcasting method according to claim 11.

14. The receive accumulating method of claim 10, wherein i) at least one of said video and speech data and ii) said file-format data which are temporarily accumulated in said predetermined accumulation area as a single stream are reproduced by utilizing at least one of said video and speech data which are extracted from said single stream.

* * * * *